US008684343B2

(12) United States Patent
Hiken et al.

(10) Patent No.: US 8,684,343 B2
(45) Date of Patent: Apr. 1, 2014

(54) COMPOSITE FABRICATION VENT ASSEMBLY AND METHOD

(75) Inventors: Alan D. Hiken, Redondo Beach, CA (US); David H. Lee, Placentia, CA (US); Robert L. Harshberger, Lakewood, CA (US); Leo H. Phan, Anaheim, CA (US); Rufino Santos, Long Beach, CA (US)

(73) Assignee: Rubbercraft Corporation of California Ltd, Long Beach, CA (US)

( * ) Notice: Subject to any disclaimer, the term of this patent is extended or adjusted under 35 U.S.C. 154(b) by 254 days.

(21) Appl. No.: 13/344,889

(22) Filed: Jan. 6, 2012

(65) Prior Publication Data
US 2013/0175749 A1 Jul. 11, 2013

(51) Int. Cl.
*B23Q 3/08* (2006.01)
(52) U.S. Cl.
USPC .......... 269/20; 269/3; 269/6; 269/35; 269/86; 29/244
(58) Field of Classification Search
USPC ............ 269/3, 6, 20, 35, 86, 95, 55, 66; 29/244–282; 285/24, 26, 29; 249/89, 249/95, 151–155, 162, 167, 168, 178, 180, 249/186
See application file for complete search history.

(56) References Cited

U.S. PATENT DOCUMENTS

| | | | | |
|---|---|---|---|---|
| 458,349 | A * | 8/1891 | Greene | 285/24 |
| 2,138,884 | A * | 12/1938 | Robinson | 285/24 |
| 3,084,961 | A * | 4/1963 | Merriman | 285/242 |
| 4,148,597 | A * | 4/1979 | Larsen | 425/389 |
| 4,852,916 | A | 8/1989 | Johnson et al. | |
| 4,858,966 | A | 8/1989 | Ciriscioli et al. | |
| 6,116,884 | A * | 9/2000 | Rowley et al. | 425/111 |
| 6,898,838 | B2 * | 5/2005 | Gordon | 29/559 |
| 7,052,567 | B1 | 5/2006 | Blackmore et al. | |
| 7,665,718 | B1 * | 2/2010 | Benson | 269/237 |
| 2011/0016686 | A1 * | 1/2011 | Earls | 29/402.04 |
| 2012/0219660 | A1 * | 8/2012 | Sana et al. | 425/470 |
| 2012/0235336 | A1 * | 9/2012 | Sana et al. | 269/47 |

FOREIGN PATENT DOCUMENTS

EP 2343181 A1 7/2011
WO WO2008015115 A1 2/2008

* cited by examiner

*Primary Examiner* — George Nguyen
(74) *Attorney, Agent, or Firm* — Sheppard, Mullin, Richter & Hampton LLP

(57) ABSTRACT

A composite fabrication vent assembly for connection to an inflatable bladder, the combination of a vent assembly and an inflatable bladder, and a method of mechanically connecting a vent assembly and a bladder. The vent assembly comprises a body member having a first clamping surface, a clamping member having a second clamping surface, and a carriage member interconnecting the body member and the clamping member, with the first and second clamping surfaces in opposing relationship. With the open end of an inflatable bladder inserted between the opposed clamping surfaces, the carriage member is adapted to translate the body member and clamping member toward one another to form an airtight seal with the inflatable bladder. A controlled source of pressurized gas, connected to a gas inlet of the vent assembly, can then inflate and deflate the bladder in a controlled manner through one or more passageways in the vent assembly.

36 Claims, 6 Drawing Sheets

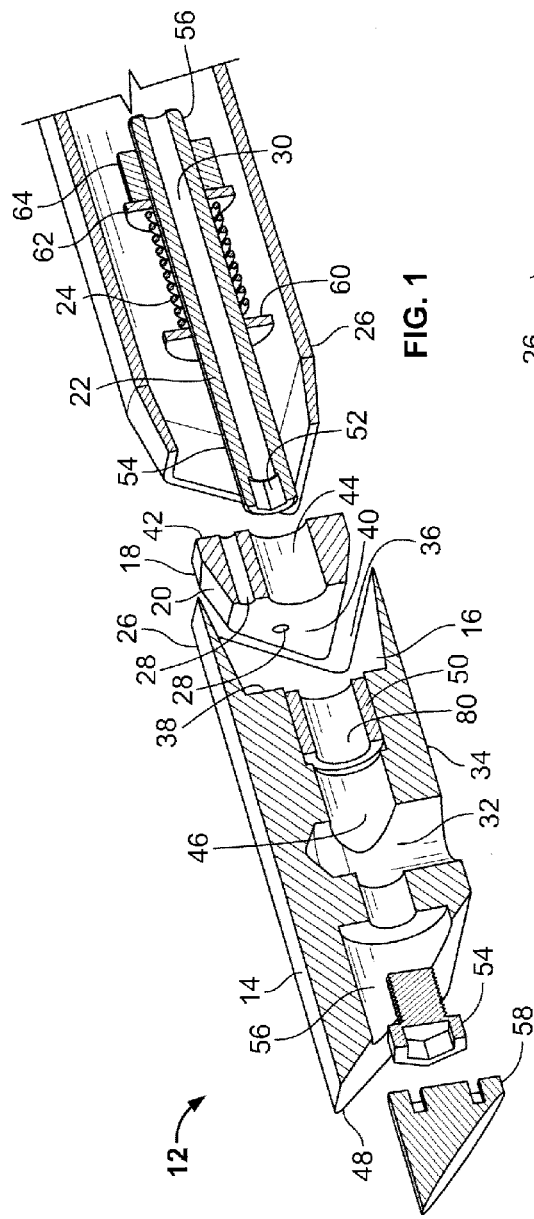
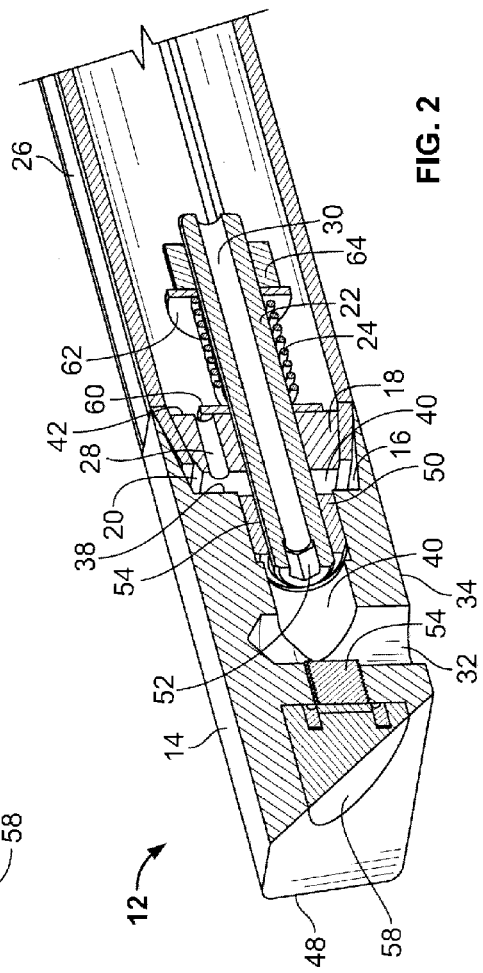
FIG. 1
FIG. 2

COMPOSITE FABRICATION VENT ASSEMBLY AND METHOD

FIELD OF THE INVENTION

This invention pertains generally to tooling apparatus used in the field of composites fabrication and, more particularly, to a vent assembly for coupling to an inflatable mandrel, and related methods.

BACKGROUND OF THE INVENTION

Composite materials are generally stronger, lighter and more resistant to high temperatures compared to steel. In general, composite materials also can be more readily formed into irregular shapes and configurations. For these reasons, composite materials are competitive with, if not replacing, steel and other materials in the manufacture of items from tennis racquets, golf clubs, and bicycle frames, to parts for automobiles, aircraft and even spacecraft.

Composite materials are typically made of two general components: a reinforcing material that provides the properties of strength and stiffness, and a binding material or matrix which acts like glue holding the reinforcing material in place. Composite materials have characteristics superior to those inherent in the reinforcing or binding materials alone.

A well known example of synthetic composite material is graphite composite. Graphite composite materials generally consist of carbon fibers, which act as the reinforcing material, held in place by binding material such as an epoxy or polymer matrix resin. The carbon fibers can be woven into cloth, braided into tubes, etc., before they are coated or impregnated with the resin matrix. After the carbon fibers are impregnated with resin, this pliable "wet layup" is applied to a mold before the resin matrix is allowed to cure. Depending on the type of resin or matrix used, curing might occur at room temperature or it might require elevated temperatures. The curing of the resin matrix causes the composite material to harden. Once the part is cured, the part is removed from the mold and any additional finishing or cleanup operations can be performed. Regardless of the manufacturing techniques or the types of reinforcing and binding materials involved, molds are typically used to define the shape of the fabricated composite component.

The molds used in composite fabrication can be either male or female. Female molds most directly effect the exterior surface of a produced component, and male molds most directly effect the interior surface of a produced component. A matched mold (male and female) is required if the part is consolidated using a press. The molds can be made from materials such as composite materials (including elastomeric materials) or metal filled epoxy, or they can be machined from aluminum or steel. Molds can also be solid or formed by inflatable structures such as bladders. The type of mold and materials used may depend on the type of part and the production quantity.

In the case of inflatable elastomeric bladders used in composite fabrication, a vent component must be attached to the bladder material in a manner that forms an airtight seal so that the vent is able to control gas flow during inflation and deflation, as well as maintain internal pressures within the bladder during the layup and curing process. Typically the vent component is bonded to the elastomeric material of the bladder using chemical adhesives. However, as discussed below the use of chemical adhesives to create an airtight bond between the bladder material and the vent component presents a number of challenges.

Adhesive bonding is a time consuming and temperamental process. Improper application of the chemical adhesive can compromise the airtight bond required to be formed between the vent component and the inflatable bladder. Some parameters that can cause a failure of the bond's ability to eliminate unwanted gas flow include quantity of adhesive applied, evenness of adhesive application, orientation of the elastomeric material of the inflatable bladder relative to the adhesive and the surface of the vent component to which the bladder is to be bonded, pressure applied to the bonding components, and curing times. For example, the presence of air bubbles in the chemical adhesive weakens the bond. Moreover, if too many air bubbles are present, the bubbles can collectively create a path for unwanted airflow causing a breach in the airtight seal. This need for highly skilled workers to ensure that proper techniques are used during the chemical bonding process equates to higher training and more labor.

The use of chemical adhesives to bond the bladder material to the vent component also introduces an additional curing cycle to the overall coupling process which can increase the coupling time flow by as much as 40% or more compared to a coupling process that does not include the chemical adhesive curing cycle.

As discussed above, the results of the chemical bonding process can be inconsistent leading to failures in the airtight seal between the inflatable bladder and the vent component during testing and prior to use in composite fabrication. The impact on the time flow is multiplied when a chemical bonding process fails because the application and curing steps for the chemical bonding of the bladder and the vent component must be repeated before the elastomeric tool is used.

Additionally, the high pressures and high temperatures to which the adhesive bond of the elastomeric tool is exposed during the layup and curing processes during composite fabrication can increase the chance of failures. At best, a failure of the mold during the composite fabrication process can cause the loss of composite materials, time, revenue, and reputation. At worst, the improper functioning of the mold due to an undetected failure in the airtight chemical bond between the bladder material and the vent component can lead to structurally deficient components being integrated into a finished product.

The chemical adhesives themselves also represent added inconvenience and expense in terms of their acquisition, storage, handling, and disposal.

Accordingly, there is a need for a composite fabrication vent assembly that can be coupled to inflatable bladders used in composite manufacturing and does not suffer from the problems described above. The present invention satisfies these and other needs, and provides further related advantages.

SUMMARY OF THE INVENTION

The present invention resides in a composite fabrication vent assembly for connection to the open end of an inflatable bladder, the combination of a vent assembly and an inflatable bladder, and a method of mechanically connecting the vent assembly to an inflatable bladder for use in composite fabrication. The composite fabrication vent assembly of the present invention is mechanical and does not use chemical adhesives, with all of their attendant problems. Moreover, the composite fabrication vent assembly accommodates irregular bladder shapes. In addition, in a further aspect of the invention, the composite fabrication vent assembly may be implemented in a manner that maintains substantially consistent clamping pressures on the inflatable bladder material despite the heating and cooling cycles inherent in the composite fabrication curing process that can lead to expansion and contraction of the vent assembly's components.

The composite fabrication vent assembly comprises a body member having a first clamping surface, a clamping member having a second clamping surface, and a carriage member interconnecting the body member and the clamping member such that the first and second clamping surfaces are in opposing relationship. The carriage member is adapted for translating the body member and clamping member relative to one another from a substantially open state to a relatively closed state. In one aspect of the invention, the first clamping surface of the body and the second clamping surface of the clamping member may have generally concave and convex configurations that are substantially complementary to one another. In another aspect of the invention, the two clamping surfaces do not need to rotate relative to one another while translating and can be formed in irregular shapes, both of which features help accommodate use of a bladder that itself has an irregular or non-circular cross-section over its end portion where clamping occurs.

When the open end of an inflatable bladder is inserted between the opposed first and second clamping surfaces of the vent assembly, the clamping surfaces form an airtight seal with the open end of the inflatable bladder as the clamping surfaces are translated to the relatively closed state. The vent assembly can then control the flow of gas into and out of the inflatable bladder during inflation and deflation through one or more passageways in the vent assembly. The composite fabrication vent assembly's ability to form a sealed mechanical connection with the open end of an inflatable bladder avoids the numerous problems accompanying the use of chemical adhesives to bond the inflatable bladder material to a composite fabrication vent.

In a more detailed aspect of the invention, the body member of the composite fabrication vent assembly may have a recess in which the first clamping surface is at least partly located. The clamping member may be adapted to be at least partially received in the recess in the body member in the relatively closed state. In this arrangement, the first clamping surface may have a generally concave configuration, while the second clamping surface may have a generally convex configuration.

The body member may also have a fluid passageway formed in it that extends through the clamping member of the composite fabrication vent assembly to allow the transmission of a pressurized gas. To this end, the composite fabrication vent assembly may include a fluid inlet in fluid communication with the fluid passageway for connection to a source of pressurized gas. The fluid passageway may be formed at least partially in the carriage member or, alternatively, the fluid passageway may be formed apart from the carriage member.

In a further aspect of the invention, the clamping member may be carried by the carriage member when translating toward the body member from the substantially open state to the relatively closed state. The carriage member may be received in an opening in the clamping member and in the body member for interconnecting the clamping member and the body member. A portion of the carriage member may comprise a lead screw for threaded engagement with the body member of the composite fabrication vent assembly. Alternatively, the carriage member may be adapted for sliding engagement with the body member, and the composite fabrication vent assembly may include a detent mechanism for holding the carriage member in a prescribed position relative to the body member when the first and second clamping surfaces are in the relatively closed state. The carriage member may be actuated by an actuating mechanism that accesses the carriage member via the body member without rotating either the body member or the clamping member during translation.

To counter the effects of heating and cooling on the clamping force between the first and second clamping surfaces due to expansion and contraction of vent assembly components, the vent assembly may include a compression member. The compression member may connect to the carriage member and act on at least one of the body member and the clamping member, to aid in maintaining adequate clamping force between the first and second clamping surfaces when the clamping surfaces are in a relatively closed state, as the vent assembly undergoes variations in pressure and temperature.

As noted, the invention resides both in a composite fabrication vent assembly as described above, as well as in the combination of such a vent assembly and a mechanically-coupled inflatable bladder.

The invention also resides, as noted, in a method for connecting a composite fabrication vent assembly as described above to the open end of an inflatable bladder in preparation for inflating the inflatable bladder to allow composite fabrication using the bladder. The method may comprise the steps of inserting the clamping member in the open end of the inflatable bladder with the bladder received over the second clamping surface, actuating the carriage member for translation of the body member and the clamping member relative to one another from a substantially open state to a relatively closed state, and translating the body member and the clamping member from the substantially open state to the relatively closed state. In the relatively closed state, the first and second clamping surfaces clamp the open end of the inflatable bladder to form a sealed connection between the inflatable bladder and the composite fabrication vent assembly.

The method of the invention further may involve the steps of connecting a fluid inlet on the composite fabrication vent assembly to a source of pressurized gas. The inflatable bladder may then be inflated in a controlled manner through one or more fluid passageways in the body member and the clamping member to the desired pressure to allow a composite fabrication to be formed thereon.

Other features and advantages of the invention will be apparent from the following detailed description of the preferred embodiments taken in conjunction with the accompanying drawings, which illustrate, by way of example, the principles of the invention.

BRIEF DESCRIPTION OF THE DRAWINGS

Various embodiments of the present invention will now be described, by way of example only, with reference to the following drawings, in which:

FIG. 1 is an exploded and sectioned view showing the various components of an embodiment of the composite fabrication vent assembly in accordance with the present invention, including a vent shell, a vent plug, a tension rod, a compression spring, and an inflatable bladder.

FIG. 2 is a sectioned view of the composite fabrication vent assembly of FIG. 1 showing the vent assembly mechanically coupled to the inflatable bladder in the relatively closed state.

DETAILED DESCRIPTION OF THE PREFERRED EMBODIMENTS

Figure 3:
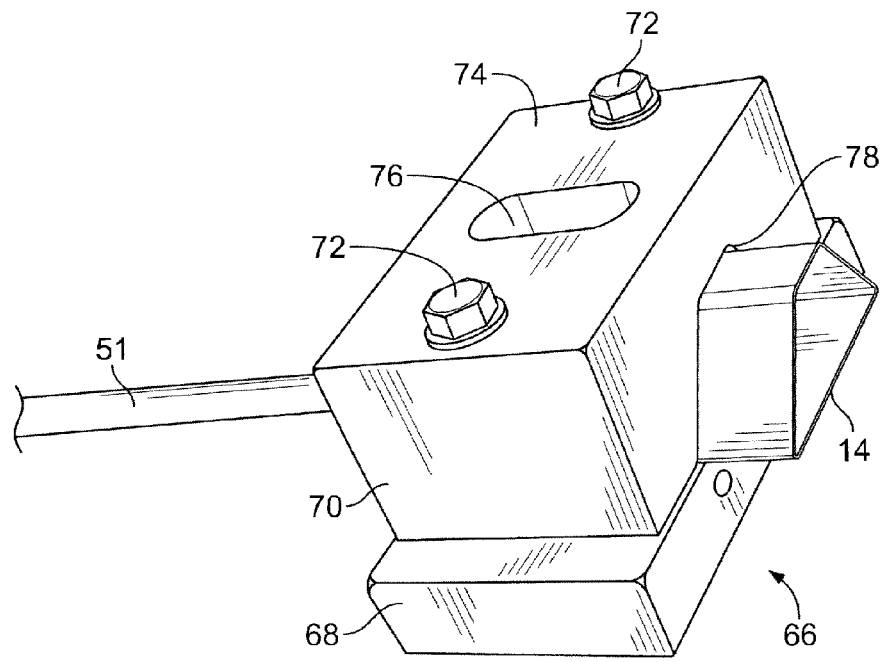
FIGS. 3-5 are views of the composite fabrication vent assembly of FIGS. 1-2 in use with an assembly fixture to mechanically couple the vent assembly to the inflatable bladder.

Referring now to the drawings, and particularly to FIGS. 1 and 2 thereof, a composite fabrication vent assembly 12 in accordance with the present invention is shown. The composite fabrication vent assembly is shown in an unassembled state in FIG. 1. It includes a body member in the form of a vent shell 14 having a first clamping surface 16, a clamping member in the form of a vent plug 18 having a second clamping surface 20, a carriage member in the faun of a pulling or tension rod 22, and a compression member in the form of a compression spring 24. The first and second clamping surfaces have generally concave and convex configurations, respectively. The two clamping surfaces are adapted to receive the open end of an inflatable bladder 26 therebetween when the composite fabrication vent assembly is assembled and in a relatively closed or clamped state, as shown in FIG. 2. The compression spring is adapted to ensure that, when the composition fabrication vent assembly is in the clamped state, adequate clamping force is maintained between the first and second clamping surfaces as the vent assembly expands and contracts while undergoing variations in pressure and temperature. The vent plug and tension rod have vent passageways 28 and 30, respectively, to allow pressurized gas to be introduced or released during inflation or deflation of the inflatable bladder. A gas inlet 32 is formed in a side wall 34 of the vent shell. The gas inlet is configured to receive a nozzle from a controlled source of pressurized gas (not shown) to inflate and deflate the inflatable bladder.

As shown in FIGS. 1 and 2, the vent plug 18 is configured to be received in a recess 36 formed in the rear end of the vent shell 14. The recess in the rear end of the vent shell has tapered side walls forming the first clamping surface 16 and a relatively flat end wall 38 within the recess. The vent plug has a generally frusto-conical configuration, with tapered side walls that form the second clamping surface 20 and relatively flat front and rear end walls 40 and 42, respectively. The configuration of the vent plug substantially complements the configuration of the recess in the vent shell, and vent plug is adapted to be received substantially entirely within the vent shell recess when the composition fabrication vent assembly 12 is in the clamped state.

The tension rod 22 serves to interconnect the vent shell 14 and the vent plug 18 and translate the vent plug relative to the vent shell. In this regard, the forward end of the tension rod is receivable with a snug, but smooth sliding fit through a through-bore 44 formed in the vent plug and into a through-bore 46 in the vent shell that opens in the end wall 38 of the recess 36 in the vent shell. The vent plug through-bore extends longitudinally through the center of the vent plug between its front and rear end walls 40 and 42. The vent shell through-bore extends longitudinally from the end wall in the vent shell recess at its rearward end through the center of the vent shell and opens in an opposite end wall 48 at the forward end of the vent shell. The gas inlet 32 extends generally perpendicular to the longitudinal axis of the vent shell through-bore, and it intersects and extends somewhat beyond the vent shell through-bore at a mid portion thereof.

Near the end wall 38 of the recess 36 at the rearward end of the vent shell 14, the end portion of the vent shell through-bore 46 has a larger, stepped diameter to receive an annular insert 50 with internals threads (not shown). Complementary threads (not shown) are formed on the forward end of the tension rod 22 for threading into the annular insert and rotational translation longitudinally in the vent shell. The annular insert may be tightly press-fit or otherwise fixed in place in the vent shell through-bore to ensure that it does not rotate.

A coupling socket 52 having a hexagonal configuration is also formed in the forward end of the tension rod 22 to allow a threading tool 51 (see FIGS. 3-4) to be releasably coupled to the tension rod to rotate it for coupling with the annular insert 50 and translation in the vent shell 14. The threading tool includes an elongated shaft with a complementary hexagonal male fitting on its end (not shown) that can be inserted through the vent shell through-bore 46 from the forward end of the vent shell to mate with the coupling socket and rotate the tension rod, as described in more detail below.

Near the forward end of the vent shell 14, the end portion of the vent shell through-bore 46 is internally threaded (not shown) to receive a threaded plug 54. The threaded plug has an O-ring (not shown) that serves to seal the through-bore after the tension rod 22 has been threaded into the annular insert 50, the composite fabrication vent assembly 12 is in the clamped state with the open end of the inflatable bladder 26 clamped between the first and second clamping surfaces 16 and 20, respectively, and the threading tool has been removed, also as described in more detail below. Preferably, an enlarged hole 56 is formed in the end wall 48 of the forward end of the vent shell, concentric with the vent shell through-bore, to facilitate insertion of the threaded plug, and an optional hole cover 58 may be received in the hole to cover the threaded plug after insertion. The hole cover aids in the vacuum bagging process for packaging the composite fabrication vent assembly 12 for delivery to the composite fabrication site by eliminating the need to protect against vacuum bag damage resulting from deformation of the vacuum bag into the hole.

The rearward portion of the tension rod 22 carries a first pressure plate 60, the compression spring 24, a second pressure plate 62 and a stop member such as a lock nut 64 or the like. Threads (not shown) are formed on the rearward end of the tension rod to receive the lock nut. The compression spring is sized to be freely received over the tension rod between the two pressure plates, with the rearward end of the compression spring disposed against the second pressure plate, and the first pressure plate disposed against the forward end of the compression spring. In the assembled state, the first pressure plate abuts the rear wall 42 of the vent plug 18 (FIG. 2). The first pressure plate is sized so that it has a snug but smooth fit on the tension rod, allowing it to slide back and forth along the tension rod as the compression spring expands and compresses in use. Alternatively, the lock nut, or equivalent structure, can be integrally formed with or affixed to the tension rod, as by machining, welding or other suitable means. As will become apparent with regard to this embodiment, however, it is important that the tension rod be allowed to freely rotate relative to at least the first pressure plate and preferably the compression spring in order to avoid any tendency to cause the vent plug to rotate with them. Also, it may be possible to replace the compression spring with an elastomeric bushing or a gas-filled bumper.

As shown in FIGS. 1-2, the vent passageways 28 in the vent plug 18 are formed by a pair of spaced-apart through-bores extending longitudinally through the vent plug between its forward and rear end walls 40 and 42, respectively. The threaded insert and/or the threaded portion of the forward end of the tension rod can have flats or grooves (not shown) to allow gas to flow past the tension rod/threaded insert junction. The vent passageway 30 in tension rod 22 is formed by a through-bore extending longitudinally through the tension rod. The vent plug passageways and the tension rod passageway are thus all in fluid communication with the gas inlet 32 when the composite fabrication vent assembly 12 is in the clamped state as shown in FIG. 2, to enable inflation and deflation of the inflatable bladder 26 via the controlled source of pressurized gas (not shown).

Figure 4:
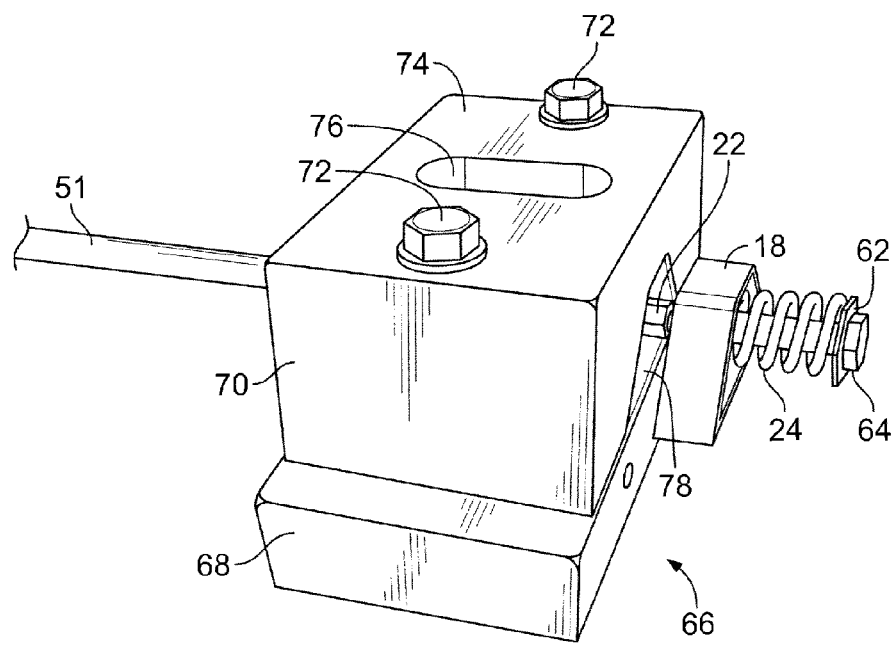
Figure 5:
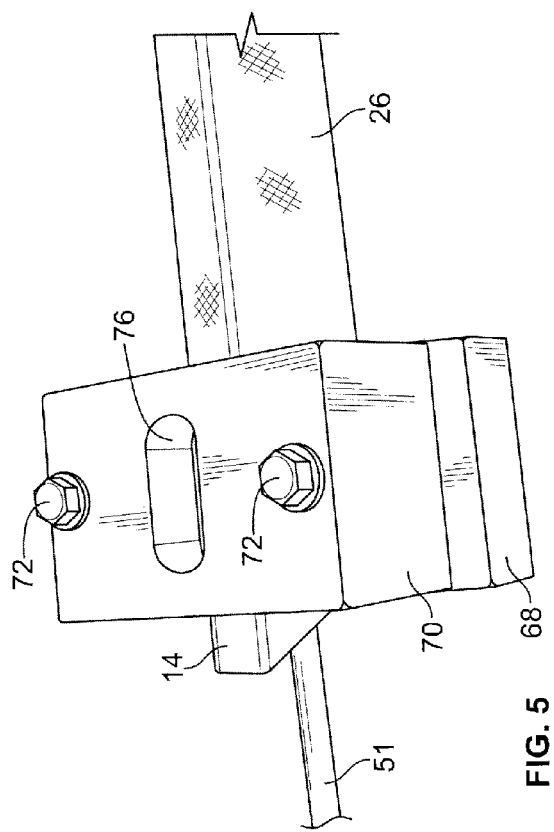

FIGS. 3-5 illustrate how the composite fabrication vent assembly 12 may be used in practice. It should be noted that the steps described hereinafter do not necessarily have to be followed in the order described. As shown in FIG. 3, an assembly jig or fixture 66 is provided to secure and stabilize the composite fabrication vent assembly and keep it from rotating while the inflatable bladder 26 is being clamped. The assembly fixture includes a base 68 supporting a housing 70 that is secured to the base by a pair of bolts 72 received through the top wall 74 of the housing. The assembly fixture has an opening 76 in the top wall, which is discussed below in connection with another embodiment. The assembly fixture also has an opening 78 on one side that extends completely through the housing to the opposite side. This opening is configured to receive the vent shell 14 with a relatively close fit. FIG. 3 shows the vent shell partially received in the fixture opening. The threading tool 51 may be inserted into the opening from the opposite side of the housing (not shown) and into the vent shell through-bore 46 from the forward end of the vent shell.

When the vent shell 14 is completely received in the opening 78 of the assembly fixture 66 as shown in FIG. 4, the combination of (i) a subassembly comprising the tension rod 22 with its first pressure plate 60 (not shown), compression spring 24, second pressure plate 62 and lock nut 64, and (ii) the vent plug 18 may then be positioned behind the rearward end of the vent assembly 12 in the opening of the fixture (FIG. 4). The male fitting on the end of the threading tool 51 may then be coupled to the female coupling socket 52 at the forward end of the tension rod. The threading tool may then be rotated, manually or more preferably in a controlled manner by machine (not shown), so that the tension rod at least partially engages the annular insert 50, but leaves the vent plug and rearward portion of the tension rod subassembly exposed on the outside of the fixture.

The open end of the inflatable bladder 26 may then be received over the rearward end of the tension rod subassembly and stretched over the second clamping surface 20 of the vent plug 18. The threading tool 51 may then continue to be rotated so that the tension rod 22 translates in the forward direction. As the tension rod translates forwardly, the first pressure plate 60 abuts against and pushes the vent plug into the vent shell recess 36, carrying the open end of the inflatable bladder with it, as shown in FIG. 5. During this translation process, neither the vent plug nor the inflatable bladder rotate, which allows the composite fabrication vent assembly 12 to accommodate inflatable bladders having irregular shapes.

The clamped state is reached when the open end of the inflatable bladder 26 is firmly captured between the first and second clamping surfaces 16 and 20, respectively, with adequate force between the two clamping surfaces to ensure that the open end of the bladder has an airtight seal (see FIG. 2). It should be noted that in the clamped state, the front wall 40 of the vent plug 18 does not abut the end wall 38 within the vent shell recess 36, but rather is spaced from the end wall to ensure that the vent passageways 28 in the vent plug will not be blocked. Adequate clamping force may be determined empirically, and a torque or other force measuring device (not shown) may be used manually or incorporated into the machine for rotating the threading tool 51 to control the clamping force that is applied, as those skilled in the art will readily appreciate.

Once the clamped state is reached and the open end of the inflatable bladder 26 is sealed between the first and second clamping surfaces 16 and 20, respectively, the threading tool 51 may be disconnected from the vent assembly 12. The combined vent assembly and inflatable bladder may be removed from the assembly fixture 66. The threaded plug 54 with its O-ring is then threaded into the end of the vent shell through-bore 46 at the forward end of the vent shell 14 to seal that opening, and the hole cover 58 may be inserted into the hole 56 at the forward end of the vent shell if desired.

The nozzle from the controlled source of pressurized gas may then be connected to the gas inlet 32 in the vent shell 14 so that the inflatable bladder 26 may be inflated to the appropriate pressure via the gas inlet, the vent shell through-bore 46, and the vent passageways 28 and 30 in the vent plug 18 and the tension rod 22, respectively. As the composite fabrication process proceeds and the composite fabrication vent assembly 12 undergoes pressure and temperature changes, the compression spring 24 compresses and expands to help maintain adequate clamping force on the open end of the inflatable bladder to ensure an effective seal. When the composite fabrication process is complete, the inflatable bladder may be deflated via the vent passageways in the vent plug, the vent shell through-bore, and the gas inlet.

Figure 6:
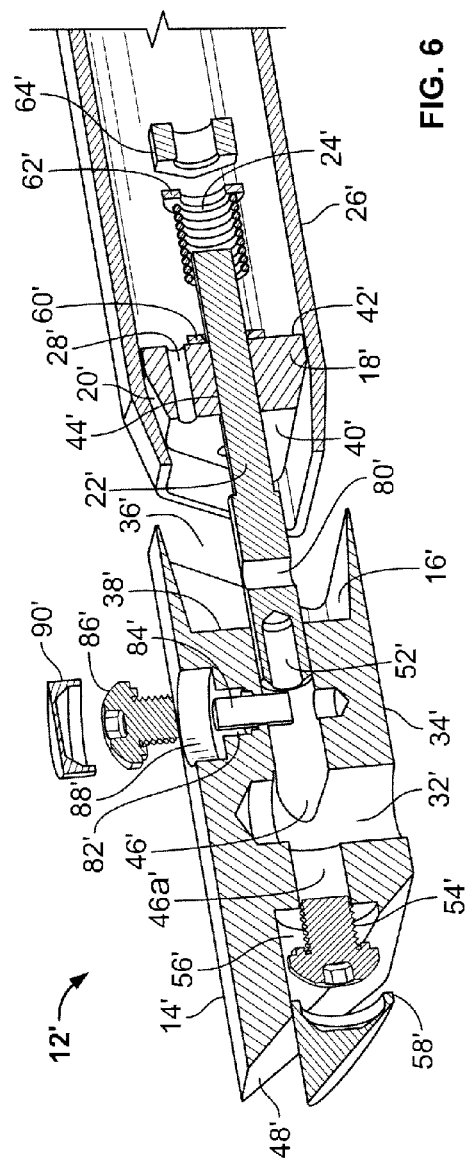
FIG. 6 is an exploded, sectional view showing the various components of an alternative embodiment of the composite fabrication vent assembly, including a vent shell, a vent plug, a tension rod, a compression spring, and an inflatable bladder.
Figure 7:
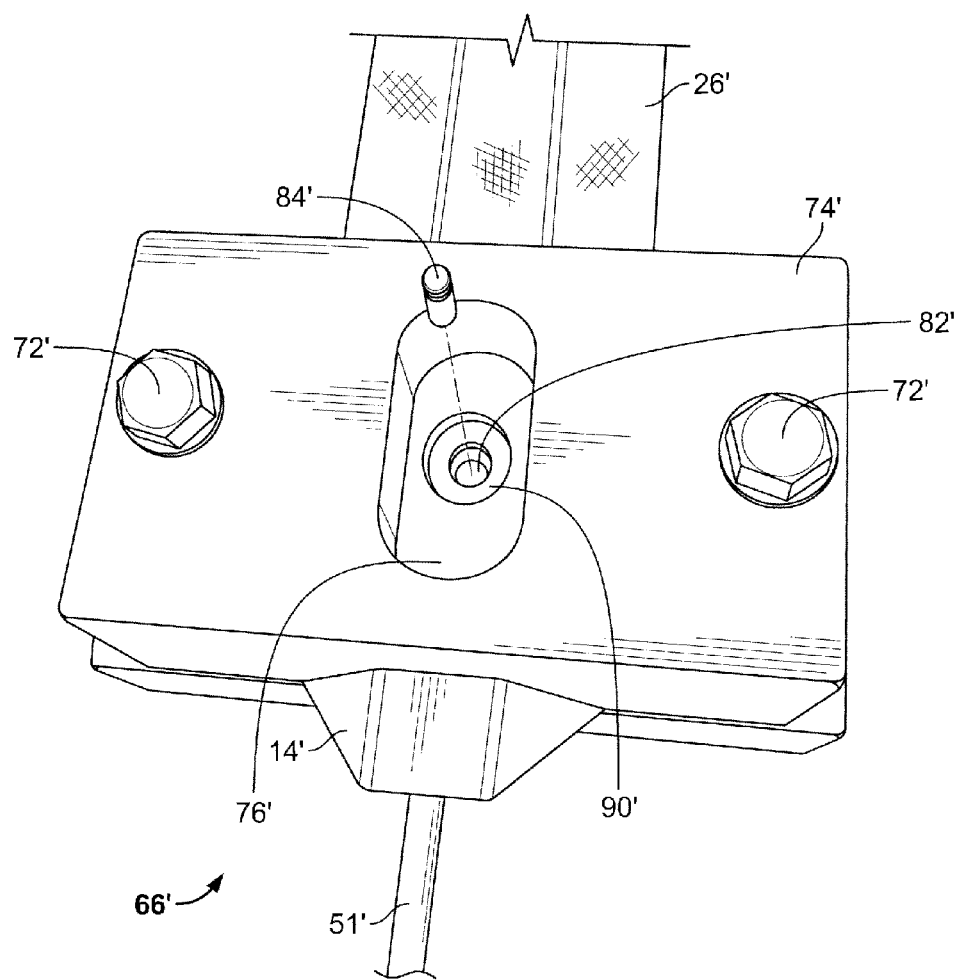
FIGS. 7-9 are views of the composite fabrication vent assembly of FIG. 6 in use with an assembly fixture to mechanically couple the vent assembly to the inflatable bladder.

Alternative embodiments of the composite fabrication vent assembly of the present invention are illustrated in FIGS. 6 and 7. In these alternative embodiments, like reference numerals will be used to designate like components.

As shown in FIG. 6, the composite fabrication vent assembly 12' similarly comprises a vent shell 14' having a first clamping surface 16', a vent plug 18' having a second clamping surface 20', a tension rod 22', and a compression spring 24'. The first and second clamping surfaces have generally concave and convex configurations, respectively, and are adapted to receive the open end of an inflatable bladder 26' therebetween. The vent plug has a vent passageway 28' to pass pressurized gas from a gas inlet 32' formed in a side wall 34' of the vent shell into the inflatable bladder, but unlike the embodiment of FIGS. 1-2 the tension rod does not have a vent passageway formed within it.

The vent plug 18' is received in a recess 36' fanned in the rear end of the vent shell 14', with the recess having tapered side walls forming the first clamping surface 16' and an end wall 38' within the recess. The vent plug has a substantially complementary configuration, with tapered side walls that form the second clamping surface 20' and forward and rear end walls 40' and 42', respectively. The vent plug is adapted to be received substantially entirely within the vent shell recess when the composition fabrication vent assembly 12' is in the clamped state.

The tension rod 22' has a stepped diameter in its mid portion, with the forward portion having a greater diameter than the rearward portion. The rearward portion of the tension rod is receivable with a sliding fit through a through-bore 44' formed in the vent plug 18', while the enlarged forward portion of the tension rod is similarly receivable through a through-bore 46' formed in the vent shell 14' that opens in the end wall 38' of the recess 36' in the vent shell. The vent plug through-bore extends longitudinally through the center of the vent plug between its forward and rear end walls 40' and 42'. The vent shell through-bore extends longitudinally from the end wall in the vent shell recess at its rearward end through the center of the vent shell to an opposite end wall 48' at the forward end of the vent shell. The gas inlet 32' intersects and extends somewhat beyond the vent shell through-bore at a mid portion thereof.

A primary difference between this embodiment and the FIGS. 1-2 embodiment is that in this embodiment the tension rod 22' does not rotationally translate in the vent shell 14', but rather is pulled into position during clamping of the inflatable bladder 26'. To this end, the vent shell does not have an annular threaded insert and the forward end of the tension rod also is not threaded. Instead, the enlarged forward portion of the tension rod 22' has a locking bore 80' formed in it, generally perpendicular to the longitudinal axis of the vent shell through-bore 46'. The vent shell 14' also has a locking bore 82' formed in it, generally perpendicular to the longitudinal axis of the tension rod. The vent shell locking bore extends from the vent shell side wall 34' (on the opposite side from the gas inlet 32') and intersects and extends somewhat past the vent shell through-bore. When the composite fabrication vent assembly 12' is in the clamped state, the tension rod locking bore and the vent shell locking bore are intended to be aligned or registered. A locking pin 84' is provided for insertion into the vent shell locking bore and through the tension rod locking bore to lock the tension rod in position. For clarity, FIG. 6 shows the locking pin inserted in the vent shell locking bore, but in practice the locking pin is inserted only after the tension rod has been pulled in the forward direction such that the composite fabrication vent assembly is in the clamped state, with the inflatable bladder 26' clamped between the first and second clamping surfaces 16' and 20', respectively.

An end portion 82a' of the vent shell locking bore 82', near the side wall 34' of the vent shell 14', has an enlarged stepped diameter that is internally threaded (not shown) to receive a threaded plug 86'. The threaded plug has an O-ring (not shown) that serves to seal the vent shell locking bore after the tension rod 22' has been locked in position by insertion of the locking pin 84'. Preferably, an enlarged hole 88' is formed in the side wall of the vent shell, concentric with the vent shell locking bore, to facilitate insertion of the threaded plug. An optional hole cover 90' may be received in the hole to cover the threaded plug.

A coupling socket 52' having internal (female) threads is formed in the forward end of the tension rod 22' to allow it to be coupled to a pulling tool (see FIG. 7) for translating the tension rod relative to the vent shell 14'. The pulling tool includes an elongated shaft with complementary external (male) threads formed on its end (not shown). The pulling tool can be inserted through the vent shell through-bore 46' from the front end of the vent shell so that its threaded end can be threaded into the coupling socket and be used to pull the tension rod, as described in more detail below.

Near the forward end of the vent shell 14', the end portion of the vent shell through-bore 46a' is internally threaded (internal threading not shown) to receive a threaded plug 54'. The threaded plug has an O-ring (not shown) that serves to seal the through-bore after the tension rod 22' has been threaded into the annular insert 50' and the composite fabrication vent assembly 12' is in the clamped state with the open end of the inflatable bladder 26' clamped between the first and second clamping surfaces 16' and 20', respectively, also as described in more detail below. Preferably, an enlarged hole 56' is formed in the end wall 48' of the forward end of the vent shell, concentric with the vent shell through-bore, to facilitate insertion of the threaded plug. An optional hole cover 58' may be received in the hole to cover the threaded plug to aid in vacuum bag packaging as discussed above.

The vent passageways 28' in the vent plug 18' are formed by a pair of spaced-apart through-bores extending longitudinally through the vent plug between its forward and rear end walls 40' and 42', respectively. Although, as noted, the tension rod 22' does not have a vent passageway formed within it, the forward portion of the tension rod has a hexagonal cross-sectional shape, resulting in spaces between its flats and the cylindrical vent shell through-bore 46' that serve as vent passageways (not shown). This allows the vent passageway in the vent plug to be in fluid communication with the gas inlet 32' when the composite fabrication vent assembly 12' is in the clamped state, to enable inflation and deflation of the inflatable bladder 26' via the controlled source of pressurized gas (not shown).

Similar to the FIGS. 1-2 embodiment, the rearward portion of the tension rod 22' carries a first pressure plate 60', the compression spring 24', a second pressure plate 62' and a lock nut 64'. Threads (not shown) are formed on the rearward end of the tension rod to receive the lock nut. The compression spring is sized to be freely received over the tension rod between the two pressure plates. The first pressure plate has a snug but smooth fit on the tension rod, allowing it to slide back and forth along the tension rod. However, unlike the embodiment of FIGS. 1-2, because the tension rod does not translate by rotation, it is not important for the tension rod to be allowed to freely rotate relative to the first pressure plate or the compression spring.

The method of using this second embodiment is similar to that of the FIGS. 1-2 embodiment discussed above and illustrated in FIGS. 3-5. As noted, the main difference is that the tension rod 22' is pulled rather than rotated, with the tension rod being locked in place by use of the locking pin 84'. As shown in FIG. 7, the assembly fixture 66' for holding the composite fabrication vent assembly 12' during the clamping process has an opening 76' through its top wall 74' that provides access to the locking bore 82' in the vent shell 14'. When the tension rod has been pulled, preferably in a controlled manner by machine (not shown), so that its locking bore 80' aligns with the vent shell locking bore, the locking pin is inserted. The pin is not intended to be removed, as this embodiment of the composite fabrication vent assembly is intended for one-time use.

Figure 8:
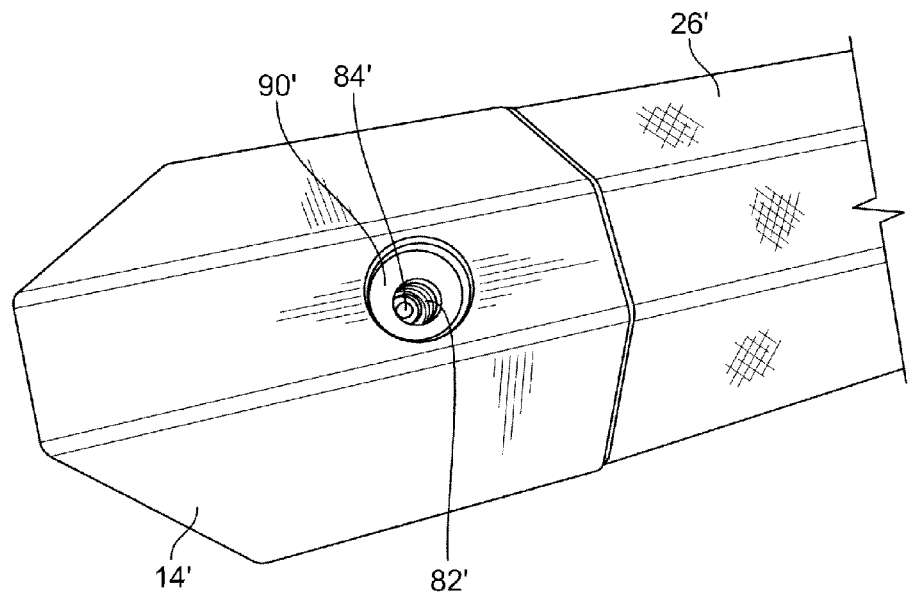
Figure 9:
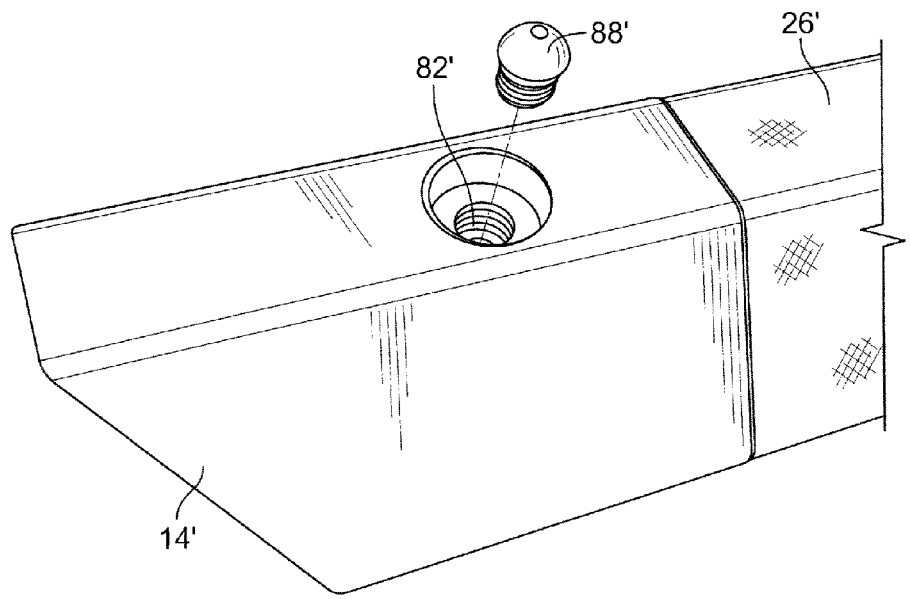

Once the locking pin is fully inserted and the tension rod 22' is locked in place, the pulling tool 51' can be disconnected from the vent assembly 12' and the combined vent assembly and inflatable bladder 26' can be removed from the assembly fixture 66', as shown in FIG. 8. The threaded plug 54' with its O-ring may then be inserted to seal the vent shell locking bore 82', as shown in FIG. 9. The hole cover 58' for the vent shell 14' (not shown) may then be inserted to cover the threaded plug if desired.

Figure 10:
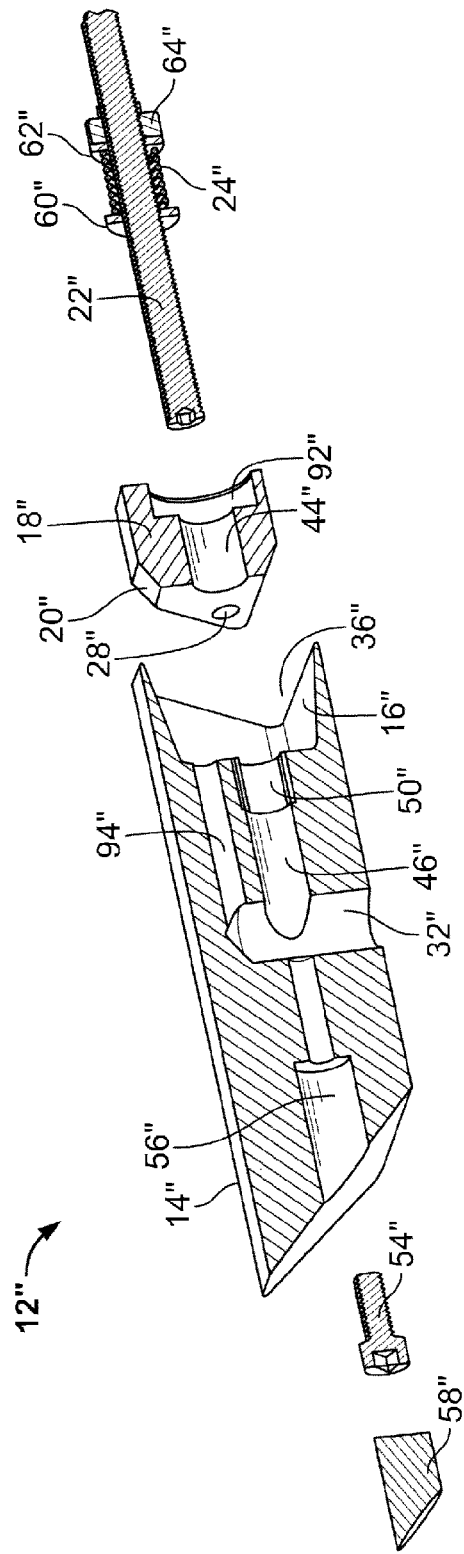
FIG. 10 is an exploded, sectional view showing the various components of a further alternative embodiment of the composite fabrication vent assembly, including a vent shell, a vent plug, a tension rod, and a compression spring.

FIG. 10 illustrates another alternative embodiment. The composite fabrication vent assembly 12" is substantially similar to the embodiment shown in FIGS. 1 and 2. In brief, it comprises a vent shell 14" having a first clamping surface 16", a vent plug 18" having a second clamping surface 20" configured to be received in a recess 36" formed in the rear end of the vent shell, a tension rod 22", and a compression spring 24". The tension rod carries a first pressure plate 60", the compression spring, a second pressure plate 62" and a lock nut 64". The vent plug and the vent shell have through-bores 44" and 46", respectively, to receive the tension rod, and the vent shell includes a gas inlet 32" that intersects and extends somewhat beyond the vent shell through-bore at a mid portion thereof. The rearward end of the vent shell through-bore has an annular insert 50" for threaded engagement with the tension rod. Near the forward end of the vent shell, the end portion of the vent shell through-bore is internally threaded to receive a threaded plug 54", and an enlarged hole 56", concentric with the vent shell through-bore is provided to receive a hole cover 58" to aid in vacuum bag packaging. The vent plug has a vent passageway 28" in the form of a through-bore.

One difference between the FIG. 10 embodiment and the FIGS. 1-2 embodiment is that, in FIG. 10, the rearward side of the vent plug 18" has a recess 92" formed in it to receive the first pressure plate 60" with a relatively close fit, and the vent plug through-bore 44" has a substantially larger diameter than the diameter of the tension rod 22" to create a passageway for gas to flow past the tension rod.

Another difference is that the tension rod 22" does not have a vent passageway formed within it. Instead, a separate vent passageway 94" is formed in the vent shell 14" in the form of a through-bore that extends from the recess 36" in the rear end of the vent shell to the portion of the gas inlet 32" that extends beyond the vent shell through-bore 46". The vent plug passageway 28" is thus in fluid communication with the gas inlet to enable inflation and deflation of an inflatable bladder (not shown) when it is clamped in place in the composite fabrication vent assembly 12".

It will be appreciated that the various embodiments of the invention described above provide a mechanical vent plug for use in the field of composite fabrication that eliminate the labor intensive, time consuming, and less reliable coupling processes that depend on chemical adhesives to bond the material of inflatable bladders to vent assemblies. The invention thus allows the physical attachment of the vent plug to an inflatable bladder more quickly, easily and dependably than when using adhesive bonding, saving substantial time and labor costs.

The present invention has been described above in terms of presently preferred embodiments so that an understanding of the present invention can be conveyed. However, the present invention should not to be seen as limited to the forms shown, which are illustrative rather than restrictive.

What is claimed is:

1. A composite fabrication vent assembly for connection to the open end of an inflatable bladder, the composite fabrication vent assembly comprising:
   a body member having a first clamping surface;
   a clamping member having a second clamping surface,
   the first and second clamping surfaces having generally concave and convex configurations that are substantially complementary to one another; and
   a carriage member interconnecting the body member and the clamping member such that the first and second clamping surfaces are in opposing relationship, wherein the carriage member is adapted for translating the body member and clamping member relative to one another from a substantially open state to a relatively closed state.

2. A composite fabrication vent assembly as set forth in claim 1, wherein the first and second clamping surfaces have irregular configurations.

3. A composite fabrication vent assembly as set forth in claim 2, wherein the body member and clamping member translate linearly without rotation relative to one another.

4. A composite fabrication vent assembly as set forth in claim 1, wherein in the relatively closed state the clamping member is adapted to be received at least partially within a recess in the body member, the first clamping surface is located at least partially in the recess and has a generally concave configuration, and the second clamping surface has a generally convex configuration.

5. A composite fabrication vent assembly as set forth in claim 1, wherein the clamping member is carried by the carriage member when translating toward the body member from the substantially open state to the relatively closed state.

6. A composite fabrication vent assembly as set forth in claim 1, wherein the carriage member is received in an opening in the body member and in the clamping member to interconnect them.

7. A composite fabrication vent assembly as set forth in claim 1, wherein the carriage member is actuated by an actuating mechanism that accesses the carriage member via the body member.

8. A composite fabrication vent assembly for connection to the open end of an inflatable bladder, the composite fabrication vent assembly comprising:
   a body member having a first clamping surface;
   a clamping member having a second clamping surface,
   a carriage member interconnecting the body member and the clamping member such that the first and second clamping surfaces are in opposing relationship, wherein the carriage member is adapted for translating the body member and clamping member relative to one another from a substantially open state to a relatively closed state; and
   a fluid passageway formed in the body member and extending through the clamping member for transmitting a pressurized gas.

9. A composite fabrication vent assembly as set forth in claim 8, and further including a fluid inlet in fluid communication with the fluid passageway for connection to a source of pressurized gas.

10. A composite fabrication vent assembly as set forth in claim 8, wherein the fluid passageway is formed at least partially in the carriage member.

11. A composite fabrication vent assembly as set forth in claim 8, wherein the fluid passageway is formed apart from the carriage member.

12. A composite fabrication vent assembly for connection to the open end of an inflatable bladder, the composite fabrication vent assembly comprising:
   a body member having a first clamping surface;
   a clamping member having a second clamping surface,
   a carriage member interconnecting the body member and the clamping member such that the first and second clamping surfaces are in opposing relationship, wherein the carriage member is adapted for translating the body member and clamping member relative to one another from a substantially open state to a relatively closed state; and
   a compression member, connected to the carriage member and acting on at least one of the body member and the clamping member, to aid in maintaining adequate clamping force between the first and second clamping surfaces.

13. A composite fabrication vent assembly for connection to the open end of an inflatable bladder, the composite fabrication vent assembly comprising:
   a body member having a first clamping surface with a generally concave configuration;
   a clamping member having a second clamping surface with a generally convex configuration;
   a carriage member interconnecting the body member and the clamping member such that the first and second clamping surfaces are in opposing relationship, wherein the carriage member is adapted for translating the body member and clamping member relative to one another from a substantially open state to a relatively closed state;

a fluid passageway formed in the body member and extending through the clamping member for transmitting a pressurized gas; and a fluid inlet in fluid communication with the fluid passageway for connection to a source of pressurized gas.

14. A composite fabrication vent assembly as set forth in claim 13, wherein in the relatively closed state the clamping member is adapted to be received at least partially within a recess in the body member, and the first clamping surface is located at least partially in the recess.

15. A composite fabrication vent assembly as set forth in claim 14, wherein the carriage member is received in an opening in the body member and in the clamping member to interconnect them, and the clamping member is carried by the carriage member when translating toward the body member from the substantially open state to the relatively closed state.

16. A composite fabrication vent assembly as set forth in claim 15, wherein at least a portion of the carriage member comprises a lead screw for threaded engagement with the body member.

17. A composite fabrication vent assembly as set forth in claim 14, wherein the carriage member is adapted for sliding engagement with the body member, and further including a detent mechanism for holding the carriage member in a prescribed position relative to the body member.

18. A composite fabrication vent assembly as set forth in claim 15, and further including a compression member, connected to the carriage member and acting on the clamping member, to aid in maintaining adequate clamping force between the first and second clamping surfaces.

19. The combination comprising:
a composite fabrication vent assembly including
a body member having a first clamping surface;
a clamping member having a second clamping surface; and
a carriage member interconnecting the body member and the clamping member with the first and second clamping surfaces in opposing relationship, the carriage member adapted for translating the body member and clamping member relative to one another from a substantially open state to a relatively closed state; and
an inflatable bladder having an open end,
wherein in the substantially open state, the open end of the inflatable bladder is positioned relative to the composite fabrication vent assembly for clamping between the first and second clamping surfaces, and
further wherein in the relatively closed state, the first and second clamping surfaces clamp the open end of the inflatable bladder to form a sealed connection between the inflatable bladder and the composite fabrication vent assembly.

20. The combination as set forth in claim 19, wherein the first and second clamping surfaces having substantially complementary concave and convex configurations.

21. A composite fabrication vent assembly as set forth in claim 20, wherein in the relatively closed state the clamping member is adapted to be received at least partially within a recess in the body member, the first clamping surface is located in the recess and has a generally concave configuration, and the second clamping surface has a generally convex configuration.

22. A composite fabrication vent assembly as set forth in claim 19, wherein the clamping member is carried by the carriage member when translating toward the body member from the substantially open state to the relatively closed state.

23. A composite fabrication vent assembly as set forth in claim 19, wherein the carriage member is received in an opening in the body member and in the clamping member to interconnect them.

24. A composite fabrication vent assembly as set forth in claim 23, wherein the carriage member is actuated by an actuating mechanism that accesses the carriage member via the body member.

25. The combination as set forth in claim 19, and further including a passageway formed in the body member and extending through the clamping member for passing a pressurized gas into the inflatable bladder.

26. The combination as set forth in claim 25, wherein the body member includes an inlet for connection to a source of pressurized gas.

27. The combination as set forth in claim 19, and further including a compression member, connected to the carriage member and acting on at least one of the body member and the clamping member, to aid in maintaining adequate clamping force between the first and second clamping surfaces.

28. A method of connecting a composite fabrication vent assembly to the open end of an inflatable bladder in preparation for inflating the inflatable bladder to allow a composite fabrication to be formed thereon, the composite fabrication vent assembly comprising a body member having a first clamping surface, a clamping member having a second clamping surface, and a carriage member interconnecting the body member and the clamping member with the first and second clamping surfaces in opposed relationship, the method comprising the steps of:
inserting the clamping member in the open end of the inflatable bladder with the bladder received over the second clamping surface;
actuating the carriage member for translation of the body member and the clamping member relative to one another from a substantially open state to a relatively closed state; and
translating the body member and the clamping member from the substantially open state to the relatively closed state, wherein in the relatively closed state the first and second clamping surfaces clamp the open end of the inflatable bladder to form a sealed connection between the inflatable bladder and the composite fabrication vent assembly.

29. A method as set forth in claim 28, wherein the first and second clamping surfaces having substantially complementary concave and convex configurations.

30. A method as set forth in claim 28, wherein in the relatively closed state the clamping member is adapted to be received at least partially within a recess in the body member, the first clamping surface is located in the recess and has a generally concave configuration, and the second clamping surface has a generally convex configuration.

31. A method as set forth in claim 28, wherein the clamping member is carried by the carriage member when translating toward the body member from the substantially open state to the relatively closed state.

32. A method as set forth in claim 28, wherein the carriage member is received in an opening in the body member and in the clamping member to interconnect them.

33. A method as set forth in claim 28, wherein the carriage member is actuated by an actuating mechanism that accesses the carriage member via the body member.

34. The method as set forth in claim 28, wherein the body member includes a fluid inlet for connection to a source of pressurized gas, and the body member and the clamping member include one or more fluid passageways in fluid communication with the fluid inlet, the method including the further steps of:

connecting the fluid inlet to a source of pressurized gas; and
   inflating the inflatable bladder in a controlled manner through the one or more fluid passageways in the body member and the clamping member to the desired pressure to allow a composite fabrication to be formed thereon.

35. A method as set forth in claim 34, and further including a fluid passageway formed in the carriage member for transmitting pressurized gas from the body member through the clamping member.

36. A method as set forth in claim 28, and further including a compression member, connected to the carriage member and acting on at least one of the body member and the clamping member, to aid in maintaining adequate clamping force between the first and second clamping surfaces.

\* \* \* \* \*

UNITED STATES PATENT AND TRADEMARK OFFICE
CERTIFICATE OF CORRECTION

PATENT NO.         : 8,684,343 B2  
APPLICATION NO.    : 13/344889  
DATED              : April 1, 2014  
INVENTOR(S)        : Alan D. Hiken et al.

Page 1 of 1

It is certified that error appears in the above-identified patent and that said Letters Patent is hereby corrected as shown below:

In the Specification

Column 5, line 24, "faun" should be -- form --.

Column 8, line 51, "fanned" should be -- formed --.

Signed and Sealed this
Thirteenth Day of January, 2015

Michelle K. Lee
*Deputy Director of the United States Patent and Trademark Office*